(12) United States Patent
Deane et al.

(10) Patent No.: US 9,291,291 B2
(45) Date of Patent: Mar. 22, 2016

(54) TUBE FITTING WITH INTEGRATED SEAL

(71) Applicant: TI Group Automotive Systems, LLC, Auburn Hills, MI (US)

(72) Inventors: Alastair Deane, Rochester Hills, MI (US); Uwe Fiedler, Altluβheim (DE)

(73) Assignee: TI Group Automotive Systems, LLC, Auburn Hills, MI (US)

( * ) Notice: Subject to any disclaimer, the term of this patent is extended or adjusted under 35 U.S.C. 154(b) by 401 days.

(21) Appl. No.: 13/901,036

(22) Filed: May 23, 2013

(65) Prior Publication Data
US 2014/0345736 A1 Nov. 27, 2014

(51) Int. Cl.
*F16L 9/00* (2006.01)
*F16L 19/02* (2006.01)

(52) U.S. Cl.
CPC ......... *F16L 19/0212* (2013.01); *F16L 19/0218* (2013.01)

(58) Field of Classification Search
CPC ........................... F16L 19/0212; F16L 19/0218
USPC ........ 138/109; 277/625, 626, 622; 285/332.2, 285/332.3
See application file for complete search history.

(56) References Cited

U.S. PATENT DOCUMENTS

| | | | | |
|---|---|---|---|---|
| 1,133,320 A | * | 3/1915 | Rockwood | .......... F16L 19/0218 277/622 |
| 3,139,294 A | * | 6/1964 | Richards, Jr. | ......... F16L 19/046 277/622 |
| 4,570,981 A | * | 2/1986 | Fournier | ............. F16L 19/0218 285/332.3 |
| 4,867,116 A | | 9/1989 | Rosa et al. | |
| 5,082,243 A | * | 1/1992 | Berglund | ............ F16L 19/0206 251/144 |
| 5,380,019 A | * | 1/1995 | Hillery | .................... F16J 15/061 277/626 |
| 5,503,438 A | * | 4/1996 | Swauger | ............. F16L 19/0218 277/622 |
| 5,507,531 A | * | 4/1996 | Aldridge | ............. F16L 19/0218 277/626 |
| 5,518,279 A | * | 5/1996 | Harle | .................. F16L 19/0218 285/332.3 |
| 5,658,025 A | | 8/1997 | Ridenour | |
| 5,887,912 A | * | 3/1999 | Nakamura | .......... F16L 19/0212 285/293.1 |
| 6,536,397 B2 | | 3/2003 | Mizutani | |
| 7,150,478 B2 | * | 12/2006 | Poirier | .................... F16L 33/18 285/332.2 |
| 7,533,909 B2 | | 5/2009 | Sausner et al. | |
| 8,172,278 B2 | | 5/2012 | Abbott et al. | |
| 2006/0162686 A1 | | 7/2006 | Heigl | |
| 2012/0319026 A1 | | 12/2012 | Takahashi et al. | |

* cited by examiner

Primary Examiner — Patrick F Brinson
(74) Attorney, Agent, or Firm — Brinks Gilson & Lione

(57) ABSTRACT

A tube for a fuel injection system having an end form defining a spherical surface to seal against a receiver in fluid tight relation. The tube and end form may be made of steel or stainless steel. The spherical surface includes an integrated seal surface defining layer comprising material bonded to the spherical surface, which has a hardness lower than the hardness of the material of the end form and may comprise copper, copper-nickel alloy, copper alloy, nickel or manganese. In alternative forms, the material is deposited on the end form spherical seal surface by various processes including deposition by heating, using moistening effects, galvanic, evaporation, or any other suitable deposition process.

15 Claims, 2 Drawing Sheets

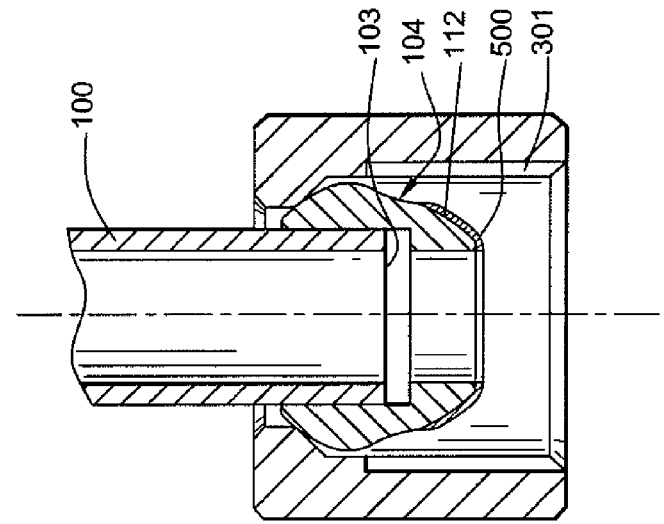
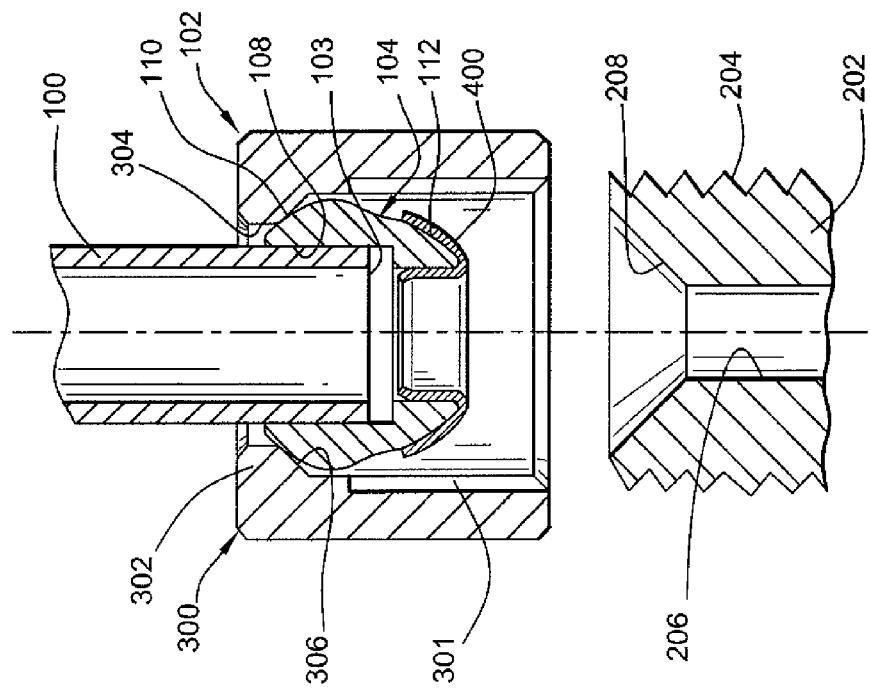

TUBE FITTING WITH INTEGRATED SEAL

BACKGROUND

This disclosure relates to a tube fitting for connection of a tube to a fluid system component particularly suitable for automotive fuel injection systems. It further relates to such a fitting having a seal surface defining the interface between the connected tube and associated system components.

Modern automotive fuel systems include fuel components that deliver liquid fuel to the engine injectors within the engine compartment. These systems are under high pressure and include fuel rails or manifolds and connecting metal tubular fuel lines. The junction between such lines and the associated components include fittings which provide a fluid tight connection that withstands the rigors of the operating environment, i.e. constant vibration, high internal pressure and high temperature.

The tubing is usually high grade stainless steel which is resistant to the fuel being delivered. The tubing is usually bent into specific shapes to extend between junctions where it attaches by a threaded fitting to an associated receiver.

Typically the connection includes a receiver or body secured to the system component that defines an annular seat against which the shaped end of the tube is compressed. A threaded nut surrounds the tube and engages with receiver body. The tube includes an enlarged end form configuration shaped to abut the seat surface in fluid tight relation. The threaded nut urges the end configuration into sealing engagement with the seat.

Because of the hardness of the tube material, usually stainless steel, and the vibration associated with engine operation, some fittings include a separate seal element interposed between the end of the tube and the seat of the receiver. This seal element may be made of material having low friction properties, such as copper alloy which possesses durability under extreme vibratory conditions. It is also a material unaffected by the fuel within the fluid system.

In some instances, the separate seal element is fixed to the tube end form by mechanical deformation. This is, however, a separate processing step that adds to complexity and manufacturing cost.

The presence of a separate seal element complicates the manufacture of the system components and also the assembly process. Often the tubing and other system components are provided by different suppliers. The presence of a separate seal element must be monitored and assured at the final assembly stage to confirm reliability, and system integrity.

SUMMARY OF THE DISCLOSURE

The connection configuration of the present disclosure includes an end form having an integrated seal surface defining layer of relatively soft or malleable material to insure a fluid tight joint against a hard metal seat surface of the receiver. It also assures the integrity of the combination to satisfy quality assurance concerns at final assembly.

The tube component of the fitting of the present disclosure includes an end form defining a spherical surface arranged for joinder to an associated receiver in fluid tight relation. It includes an integrated seal surface defining layer of dissimilar material having a hardness lower than the hardness of the material of the end form. Suitable materials include copper, copper alloy, copper-nickel alloy, nickel and manganese. The seal surface defining layer is bonded to the end form surface by a suitable deposition process. That is, the seal surface defining layer is deposited onto the spherical end form surface of the tube end form by liquid deposition, brazing, or other process.

DESCRIPTION OF THE DRAWINGS

FIG. 2 is a sectional side view of an end form of the tube of FIG. 1 illustrating a known seal element.

FIG. 3 is a sectional side view of an end form of the tube of FIG. 1 illustrating the principles of the present disclosure.

DETAILED DESCRIPTION OF THE ILLUSTRATED EMBODIMENT

Figure 1:
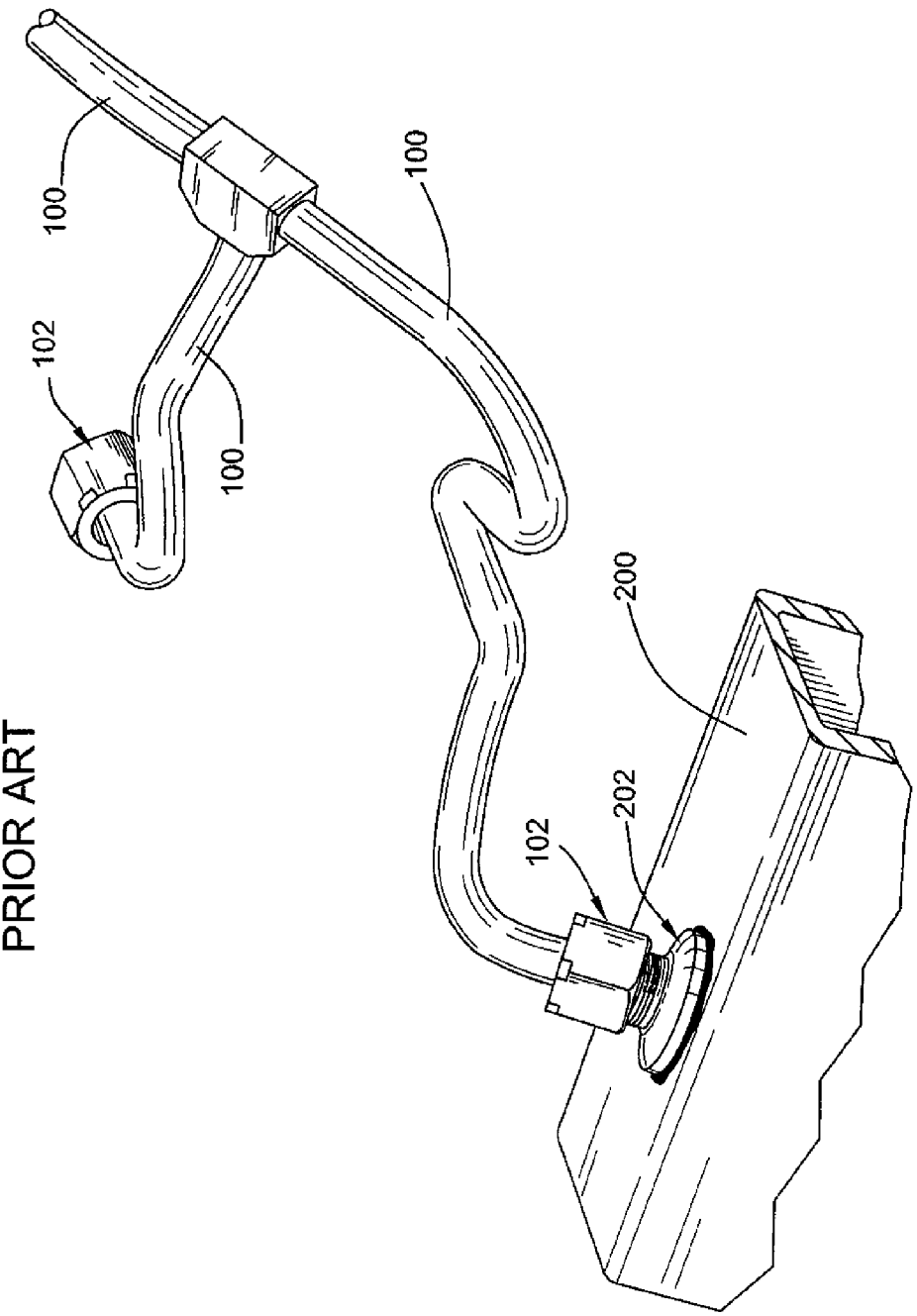
FIG. 1 is a plan view of a tube and a component of a fluid system, particularly an engine fuel injection system.

Turning now to the drawings, FIG. 1 illustrates a tube 100 for use in a fluid system particularly an engine fuel injection system. It is arranged to carry fuel under pressure between system components such as a fuel rail or manifold 200. The component includes a boss or receiver 202 welded to the component 200 surrounding an access port to the component interior. As seen in FIG. 2, it has a generally annular shape with threads 204 on its exterior surface and a central bore 206 defining the fluid path. The free end of the receiver 202 defines an annular conical seat surface 208 facing outward of the receiver.

The fitting is arranged to attach the end of tube 100 in fluid tight relation to conical seat surface 208 of receiver 200. The fitting 102 includes an enlarged end form 104 on the end 103 of tube 100 and an attachment nut 300 loosely held on the tube surrounding the tube end 103 and end form 104. The end form 104 may be created by enlargement of the end of the tube as is common in tubes such as fuel delivery lines and brake lines or HVAC lines. However, with certain high strength tubes such as illustrated there that form a part of engine fuel injection systems, the end form 104 is a separate annular element attached to the end 103 of the tube 100 by brazing, soldering or other suitable process.

The illustrated end form 104 includes a central bore 108 which receives the end 103 of tube 100 and to which it is received in fluid tight relation as previously described.

The distal end of the end form 104 defines a spherical surface 110 to cooperate with attachment nut 300 as will be explained. The proximal end of the annular end form 104 defines a spherical surface 112 to coact with the conical seat surface 208 of the receiver 202 to form a fluid tight joint.

Attachment nut 300 has a hexagonal exterior surface and is generally annular. It surrounds the end 103 of tube 100. It includes an open end surrounding the end 103 of tube 100 at end form 104. The attachment nut 300 includes internal threads 301 that mate with threads 204 on receiver 200 to connect nut 300 to receiver 202.

Attachment nut 300 includes a distal end with an inward annular flange 302 having a central bore 304 that loosely surrounds tube 100. It is thus rotatable, and axially translatable relative to tube 100. An inner spherical surface 306 coacts with spherical surface 110 of end form 104 to urge the end form 104 toward conical seat surface 208 of receiver 200 on connection of tube 100 to receptacle 202 of component 200.

Tube 100 is made of a material to withstand the operational environment within an engine compartment. Usually such tubes are formed of high strength steel or stainless steel. The ends of the tube each include a fitting 104 to connect the tube 100 to a system component 200.

FIG. 2 illustrates a known connection arrangement currently used in fuel injection system applications. A separate seal element 400 is attached to the proximal end of annular end form 104 and held in place by mechanical deformation. It is a thin annular member shaped to conform to the shape of the spherical surface 112 at the proximal end of end form 104. It is held in place by mechanical deformation, though it could be attached by any suitable means.

Seal element 400 is made of copper or copper-alloy and is compressed between spherical surface 112 of end form 104 and conical seat surface 208 of receiver 202 on connection of attachment nut 300 to thread 204 of receiver 202. On such connection of attachment nut 300 the seal element 400 is compressed between spherical surface 112 of stainless steel end form 104 and conical seat surface 208 of receiver 200 also made of stainless steel. It provides the requisite malleability to assure a fluid tight joint.

Referring to FIG. 3, there is illustrated a fitting made in accordance with the present disclosure. It includes a tube 100 configured as in the known configuration for affixation to a receive 200, illustrated in FIG. 2. The fitting includes an end form 104 and an attachment nut 300 as described configured as described in connection with FIG. 2. It functions in the same way to secure tube 100 to receiver 200 in a fluid tight relation. Here however, no separate seal element is utilized. Rather, a seal surface defining layer 500 of dissimilar material is integrally provided upon spherical surface 112 of end form 104. That is, seal surface defining layer 500 comprises relatively soft, malleable material such as copper, copper-nickel alloy, copper alloy, nickel, manganese, or other suitable material bonded directly to spherical surface 112 by deposition, brazing or other methods of deposition, including, but not limited to using the moisturizing effects of the deposition material.

Seal surface defining layer 500 may be made from any suitable material that possesses a hardness lower than the hardness of the spherical surface 112 of end form 104 and conical seat 208 of receiver 202. Suitable materials include copper, copper alloy, copper-nickel alloy, nickel, or manganese. The seal surface defining layer 500 may be created on spherical surface 112 in a thickness of from 0.05 mm. to about 0.75 mm. Preferably, the material of the seal surface defining layer is known for its malleable properties.

Since the seal surface defining layer 500 is integral with the end form, it cannot be dislodged during transit of the tube sub-assembly to an OEM manufacturer. The seal surface defining layer is available to provide a relatively soft metallic seal between the spherical surface 112 and conical seat surface 208 of the receiver to accommodate the conditions of the operating environment. Thus, the integrity of the fluid tight connection is assured. It is of course contemplated that the seal surface defining layer 500 may be applied on the end form 104 or with an end form made by deformation of the tube end (a flared tube end).

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The claims are to be construed to include alternative embodiments to the extent permitted by the prior art.

The invention claimed is:

1. A tube having an enlarged end form defining a spherical surface, the end form being a separate element attached to said tube end in fluid tight relation, and a seal surface defining layer integrally formed on said spherical surface comprising a material dissimilar from the material of said end form material, wherein said material of said seal surface defines layer has a hardness lower than the hardness of the material of said end form.

2. A tube as claimed in claim 1 wherein said end form is made of high strength stainless steel.

3. A tube as claimed in claim 1 wherein said seal surface defining layer is bonded to said spherical surface of said end form.

4. A tube as claimed in claim 3 wherein said seal surface defining layer is made of a material selected from the group consisting of copper, copper alloy, copper-nickel alloy, nickel or manganese.

5. A tube as claimed in claim 4 wherein said seal surface defining layer is deposited upon said spherical surface by deposition.

6. A tube having an enlarged end form defining a spherical surface, a seal surface defining layer integrally formed on said spherical surface comprising a material dissimilar from the material of said end form material, wherein said tube further includes an attachment nut including an open end and an interior thread for connection to a receiver, said attachment nut including an inward flange loosely connecting said nut to said tube, said end form having a distal end with a spherical surface spaced from said spherical surface having said seal surface defining layer, said attachment nut having an inner spherical surface engaging said spherical surface on said distal end of said end form.

7. A tube as claimed in claim 6 wherein said material of said seal surface defining layer has a hardness lower than the hardness of the material of said end form.

8. A tube as claimed in claim 7 wherein said end form comprises a separate element attached to said tube end in fluid tight relation.

9. A tube as claimed in claim 7 wherein said end form is made of high strength stainless steel.

10. A tube as claimed in claim 7 wherein said seal surface defining layer is bonded to said spherical surface of said end form.

11. A tube as claimed in claim 10 wherein said seal surface defining layer is made of a material selected from the group consisting of copper, copper alloy, copper-nickel alloy, nickel or manganese.

12. A method of forming a tube as claimed in claim 7 comprising forming said seal surface defining layer of a material having a hardness lower than the hardness of the material defining said end form.

13. A method of forming a tube as claimed in claim 12 comprising bonding said seal surface defining layer to said spherical surface of said end form.

14. A method of forming a tube as claimed in claim 13 comprising forming said seal surface defining layer of a material selected from the group consisting of copper, copper alloy, copper-nickel alloy, nickel or manganese.

15. A method of forming a tube as claimed in claim 14 comprising forming said seal surface defining layers by bonding said seal surface defining layer into said spherical surface.

* * * * *